United States Patent
Gunda et al.

(10) Patent No.: US 11,860,778 B2
(45) Date of Patent: Jan. 2, 2024

(54) EFFICIENT CLOUD GARBAGE COLLECTION MECHANISM FOR LOWERING CLOUD COSTS WHEN USING CLOUD TIERS OR STORAGE CLASSES WITH MINIMUM STORAGE DURATIONS

(71) Applicant: EMC IP Holding Company LLC, Hopkinton, MA (US)

(72) Inventors: Kalyan C. Gunda, Bangalore (IN); Jagannathdas Rath, Bengaluru (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 40 days.

(21) Appl. No.: 17/452,354

(22) Filed: Oct. 26, 2021

(65) Prior Publication Data

US 2023/0125574 A1    Apr. 27, 2023

(51) Int. Cl.
  *G06F 12/12*    (2016.01)
  *G06F 12/02*    (2006.01)
  *G06F 16/188*   (2019.01)
  *G06F 16/174*   (2019.01)

(52) U.S. Cl.
  CPC ...... *G06F 12/0253* (2013.01); *G06F 16/1748* (2019.01); *G06F 16/188* (2019.01)

(58) Field of Classification Search
  CPC . G06F 12/0253; G06F 16/1748; G06F 16/188
  USPC ........................................................ 707/813
  See application file for complete search history.

(56) References Cited

U.S. PATENT DOCUMENTS

| | | | |
|---|---|---|---|
| 9,940,037 B1* | 4/2018 | Bent | G06F 3/0656 |
| 10,380,098 B1* | 8/2019 | Marelas | G06F 16/2365 |
| 10,409,693 B1* | 9/2019 | Liang | G06F 16/164 |
| 10,515,009 B1* | 12/2019 | Wallace | G06F 12/0253 |
| 10,540,575 B1* | 1/2020 | Brody | G06V 10/82 |
| 10,795,812 B1* | 10/2020 | Duggal | G06F 3/067 |
| 2006/0155791 A1* | 7/2006 | Tene | G06F 12/0269 |
| | | | 711/E12.012 |
| 2007/0156967 A1* | 7/2007 | Bond | G06F 12/0862 |
| | | | 711/E12.009 |
| 2009/0327374 A1* | 12/2009 | Wright | G06F 12/0269 |
| 2010/0169593 A1* | 7/2010 | Siegwart | G06F 12/0276 |
| | | | 711/E12.001 |
| 2013/0159648 A1* | 6/2013 | Anglin | G06F 11/1453 |
| | | | 711/E12.103 |
| 2014/0214782 A1* | 7/2014 | Verma | G06F 16/1824 |
| | | | 707/695 |
| 2016/0285970 A1* | 9/2016 | Cai | H04L 69/162 |
| 2017/0060764 A1* | 3/2017 | Shetty | G06F 12/126 |
| 2019/0132415 A1* | 5/2019 | Viswanathan | H04L 67/289 |
| 2020/0250083 A1* | 8/2020 | Shilane | G06F 3/0608 |
| 2020/0310686 A1* | 10/2020 | Truong | G06F 3/061 |
| 2020/0310964 A1* | 10/2020 | Lu | G06F 3/0683 |
| 2020/0310965 A1* | 10/2020 | Brandt | G06F 3/061 |

(Continued)

*Primary Examiner* — Hicham Skhoun
(74) *Attorney, Agent, or Firm* — Workman Nydegger

(57) ABSTRACT

One example method includes scanning, at a cloud storage site, metadata associated with an object stored at the cloud storage site, fetching, from the metadata, an object creation time for the object, and determining whether the object is out of a minimum storage duration. When the object is out of the minimum storage duration, it is copy-forwarded and then marked for deletion, and when the object is not out of the minimum storage duration, the object is deselected from a list of objects to be copied forward.

20 Claims, 3 Drawing Sheets

(56) References Cited

U.S. PATENT DOCUMENTS

| | | | |
|---|---|---|---|
| 2020/0334143 A1* | 10/2020 | Noto | G06F 9/505 |
| 2023/0077938 A1* | 3/2023 | Yarlagadda | G06F 16/1752 |
| | | | 707/662 |

* cited by examiner

EFFICIENT CLOUD GARBAGE COLLECTION MECHANISM FOR LOWERING CLOUD COSTS WHEN USING CLOUD TIERS OR STORAGE CLASSES WITH MINIMUM STORAGE DURATIONS

FIELD OF THE INVENTION

Embodiments of the present invention generally relate to garbage collection in data storage systems. More particularly, at least some embodiments of the invention relate to systems, hardware, software, computer-readable media, and methods for efficient, and cost-effective, garbage collection in cloud tier environments where copy forward processes are employed, and a minimum storage duration is enforced.

BACKGROUND

In an active/local tier of a typical data deduplication, or 'dedup,' system, new files are ingested and old files are deleted. These ingestion and deletion processes are cyclically performed on an ongoing basis. As a result of these processes, many of the data segments, or simply 'segments,' within different containers may no longer be referenced by any files. That is, those data segments may become dead segments. For example, a data segment of a file that has been deleted may be considered to be a dead segment since there is no existing file that references, or uses, that data segment.

Thus, a container may become fragmented, that is, the container may include a mix of live data segments and dead data segments. This fragmentation problem may be cascaded to a cloud tier when, for example, the container data, which may reside at a local enterprise site, is backed up to a cloud storage site. Thus, both the local site and the cloud tier may be required to employ respective garbage collection processes to clean up the unused/dead segments. In the case of data storage in the cloud tier, for example, a cloud GC process may operate to reclaim the space used by dead segments within fragmented cloud objects.

Particularly, such a cloud GC process may use mark and sweep space reclamation techniques to reclaim the storage space from dead segments and unused objects at the cloud storage site. In general, the cloud GC process may scan through the meta data of the deduped cloud objects and select unused or dead objects, that have no live segments, and may also select partially filled objects or fragmented objects, that may include a mix of live and dead segments. Next, the GC process may merge the live segments from the fragmented objects and write those live segments into new container objects, that is, the GC process may copy only the live segments. Next, the fragmented and dead objects may be marked as "to-be-deleted." Finally, a recipe may be prepared which has all the necessary information needed for GC at the cloud site, such as metadata and mapping information of newly created objects, copy forward information, and details of objects to be deleted. The recipe may then be sent to the cloud site for execution. While this approach has proven to be somewhat effective in certain circumstances, problems nonetheless remain.

By way of background, cloud storage tier/classes of data may have a minimum associated storage period and, at any point of time, there may be a large number of objects which are still within their respective minimum storage duration. That is, a minimum storage period may specify a particular, minimum, amount of time that any particular object or objects must be stored at the cloud site. Thus, if a GC process selects such objects, that is, objects with a minimum storage duration, for copy-forwarding, then the GC process will copy the relevant live segments from these objects and write those live segments to new objects in the cloud, and the CG process will then delete all these old objects whose live segments were copied forward.

However, because the cloud provider is enforcing a minimum storage time billing, even if the GC process deletes the copy-forwarded objects, that is, the now-deleted objects whose live segments were copied forward, the owner of those objects will still be billed for the complete minimum duration storage time of the now-deleted objects. As well, the customer will also be billed for at least the minimum storage time for the new objects created as a result of the copy-forward process. At least as to the live segments that were copied forward, the customer is being double billed.

Thus, the total cost to the customer for cloud storage of the customer data increases by a significant extent every time the cloud GC process runs and performs copy-forward operations. This problem may be exacerbated over time if the minimum storage duration time exceeds the length of the cloud GC cycle. For example, if the minimum storage duration is 90 days, and GC schedule is 30 days, then, for each minimum storage period, three CG processes (90/30) will be performed, resulting in the creation of three new batches of copy-forwards and a substantial number of new objects, that is, new objects with the live segments that were copied forward. Because each of the new objects will have a respective minimum storage duration, the additional expense to the customer may be significant.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
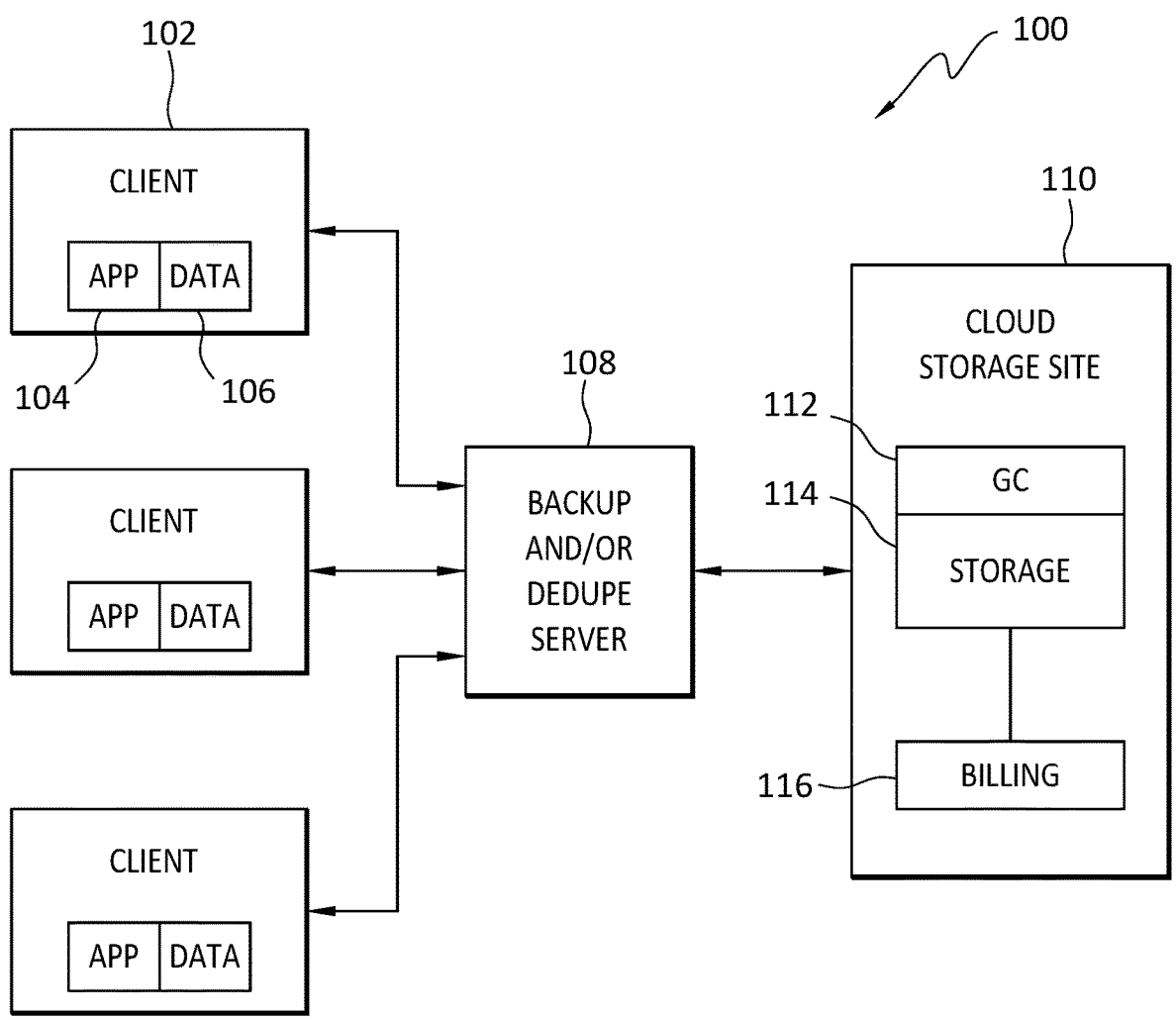
FIG. 1 discloses aspects of an example operating environment for some embodiments of the invention.

Embodiments of the present invention generally relate to garbage collection in data storage systems. More particularly, at least some embodiments of the invention relate to systems, hardware, software, computer-readable media, and methods for efficient, and cost-effective, garbage collection in cloud tier environments where copy forward processes are employed, and a minimum storage duration is enforced. Embodiments may involve performing the disclosed processes on millions, or more, objects, in a data storage environment. As well, the disclosed methods may be performed on a continual basis as data segments of objects expire and/or data segments are created/modified.

In general, example embodiments of the invention may operate to implement a cost filter phase for cloud GC (Garbage Collection) processes. The cost filter phase may be employed in conjunction with otherwise conventional GC processes. In an example cost filter phase, cloud GC may iterate all selected objects for copy-forwarding and, for each object, the cloud GC may fetch the object creation time from metadata. The cost filter phase may then check, for each of one or more objects, if the object is still within the minimal storage duration or not. One example of pseudocode or an algorithm for this process may be: If Current Time <(Creation Time+Min Storage Duration) Then Object is STILL UNDER Min Storage Duration, Else, Object is now OUT OF Min Storage Duration purview. The cost filter phase may then deselect, from a copy forwarding process, all such objects which are found to be still within the minimum storageduration. The cloud GC process may then perform the copy-forward only for the final list of objects, that is, the objects which are beyond their respective minimum storage duration. By using this selective approach to copy-forward, embodiments do not copy objects that are already in storage, as dictated by their minimum storage time.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that objects and, thus, the segments that make up those objects, are not copied or stored more often than necessary, thus reducing the storage cost to the customer relative to the storage cost associated with approaches in which an object is copied forward and stored even when that object is still within its minimum storage duration. An embodiment of the invention may reduce, relative to conventional approaches, the amount of time needed for a GC process to run, since the number of copy forwards and new object creations may be reduced by only copying forward objects that have exceeded their minimum storage duration. Various other possible advantages of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of an Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. The new and/or modified data may be deduplicated before, or after, storage in a storage environment. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

New and/or modified data, as well as dead or expired data, may be stored in one or more containers. The containers may be located at various sites, including a local enterprise site, and at a remote cloud storage site. Containers may include only live segments, only dead segments, or combinations of live segments and dead segments.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

With particular attention now to FIG. 1, one example of an operating environment for embodiments of the invention is denoted generally at 100. In general, the operating environment 100 may include one or more clients 102 that each host a respective group of one or more applications 104 that may operate to generate new and/or modified data 106. The applications 104 may also operate to delete data.

The clients 102 may communicate with a backup and/or dedup server 108. In general, the backup and/or dedup server 108 may operate to deduplicate the data 106 prior to storage of the data 106 at a cloud storage site 110. In some embodiments, the dedup functionality of the backup and/or dedup server 108 may be implemented at the cloud storage site 110, rather than at the backup and/or dedup server 108. In some embodiments, a separate backup server and dedup server may be provided that may communicate with each other and with one or more clients, and with a cloud storage site.

The backup and/or dedup server 108 may also cooperate with one or more of the clients 102 to create backups of the data 106. These backups may be communicated by the backup and/or dedup server 108 to the cloud storage site 110. The backups may be deduplicated by the backup and/or dedup server 108, or by the cloud storage site 110.

The cloud storage site 110 and/or the backup and/or dedup server 108 may generate and/or gather metadata concerning any data stored, or to be stored, at the cloud storage site 110. Such metadata, which may be stored at the cloud storage site 110 and/or may be stored at the backup and/or dedup server 108, may include, but is not limited to, minimum storage information for objects stored at the cloud storage site 110 and/or minimum storage information for objects to be stored at the cloud storage site 110, and/or for new objects created at the cloud storage site 110. The cloud storage site 110 may also include a cloud provider price list API (Application Program Interface) that indicates costs for different storage tiers or storage classes of the cloud storage site. Such tiers or classes may include, for example, (i) standard/hot (data more frequently accessed/modified), (ii) infrequently accessed/cold (data less frequently accessed/modified), (iii) archive (data not accessed for long periods of time, which may be measured in months or years for example), and (iv) staging/deep archive (data not accessed for many years, or never).

With continued reference to the example of FIG. 1, the cloud storage site 110 may comprise a GC (garbage collection) module 112 which runs a GC process on part or all of storage 114. The GC process may, or may not, run on a regularly scheduled basis. Finally, the cloud storage site 110 may comprise a billing module 116 that may cooperate with the storage 114 and/or with the GC module 112 to generate and transmit bills that reflect data storage costs incurred by one or more of the clients 102. The bills may be transmitted to the clients 102 and/or to other entities.

B. Overview

In some dedup systems, a file may be split into segments and these segments may be deduped across all files in the system. The segments may be packed in regions and containers which are represented as objects in the active tier or local tier, that is, on premises at the customer site. The segment sizes may generally vary between 4 KB-64 KB and the container objects may vary in size between 1 MB-4 MB, and sometimes 8 MB, or 16 MB, depending on the dedup app that is used.

With greater adaptation of cloud storage, dedup servers/apps allow moving deduped container objects to the cloud for long term retention (LTR). The dedup ratio, object sizes, and other parameters, may vary in the cloud tier though. For example, DellEMC Power Protect based DellEMC DataDomain systems supports object sizes of 1 MB in public cloud providers, and 4.5 MB in private cloud providers. The data/objects are moved by the dedup application based on various policies and configurations. One example of such a policy is one which specifies "move all the data older than 2 weeks to the cloud."

Public cloud providers such as AWS, GCP, and Azure, for example, provide S3 storage under a variety of storage classes/tiers/categories such as storage class based on access times, cost and minimum storage durations. The following storage classes are illustrative: (i) standard/hot—data more frequently accessed/modified; (ii) infrequently accessed/cold—data less frequently accessed/modified; (iii) archive—data not accessed for many months, or years; and (iv) staging/deep archive—data not accessed/modified for many years, or never. These are just a few example storage classes, but cloud providers typically have their own hierarchy and definitions along these, or similar, lines.

A number of items are worth noting about storage classes. For example, the respective costs associated with storage classes tend to decrease with the frequency of data access. Thus, it may be relatively less expensive to store data that is only rarely accessed, and relatively more expensive to store data that is frequently accessed. decreases. Accordingly, in the foregoing illustrative list, the costs may tend to be highest for the first type (i) of storage, decreasing to lowest costs for type (iv) of storage. The cost variation may be due to the processing overhead involved in fulfilling data access requests, and/or may be due to the type of storage used to store the data.

As well, the minimum storage duration for billing typically increases with a decrease in the frequency of data access. For example, if the minimum storage duration of a storage class is 30 days and an object is moved to that storage class and then retrieved back or deleted before 30 days, then storage of the object may still be billed for 30 days. By way of comparison, archival/staging storage classes may have a minimum storage duration measured in months, or years.

A final item to note is that data can be moved to one of these classes either directly by a backup server, indirectly via an automatic lifecycle configuration policy—for example, move data from standard to archive class after 90 days, or by using intelligent tiers. In general then, each data storage class may suit specific data access/usage patterns in, and/or by way of, a backup server or other computing entity.

C. Aspects of Some Example Embodiments

Attention is directed now to aspects of various example embodiments of the invention. Such embodiments may be implemented in an operating environment such as the operating environment 100 discussed above in connection with FIG. 1. However, embodiments of the invention are not required to be implemented in connection with the example operating environment 100.

C.1 Cloud Storage Tier/Class and Metadata

If a backup server uses a cloud storage tier/class in association with respective minimum storage durations, then the cloud storage tier/class information, or simply 'tier/class information,' may be stored, on an object basis, file basis, segment basis, or other basis, in the system, that is, in the backup server and/or at a cloud storage site. The cloud storage tier/class information may comprise, and/or take the form of, tier/class metadata. The cloud storage tier/class metadata may be created at various times such as, for example, when a backup is created, before/while/after a dedup process is performed, or before/while/after data is stored at a cloud storage site. The tier/class metadata may be stored persistently and/or in memory. In some embodiments, the tier/class metadata may be stored as part of one or more cloud metadata structures. The tier/class metadata may include, for example, the minimum storage duration value, which may be expressed in any suitable terms, such as number of days for example. If this minimum storage duration value is 0, that indicates that the cloud tier is not enforcing any minimum storage duration for the data to which that minimum storage duration value has been assigned.

In some embodiments, the minimum storage duration value for data may be assigned when the cloud tier that will be used to store that data, is first attached to the system, that is, the system that originated the data to be stored at the cloud storage site. More specifically, when data, such as data 106 for example (see FIG. 1) has been identified that is to be stored at a cloud storage site, such as the cloud storage site 110 for example (see FIG. 1), a cloud storage tier of the cloud storage site 110 may be attached to the system that includes the client 102 (see FIG. 1) or other system that created, and/or modified, and/or stored, the data.

C.2 Cloud Storage Provider Price List API

While some embodiments employ tier/class metadata that defines minimum storage duration values, other embodiments may employ a different, or complementary, approach. For example, in some embodiments, when a cloud tier is attached to the system, embodiments of the invention may query, such as by using a backup server, dedup server, or backup/dedup server, the cloud provider price list APIs. Example cloud provider APIs that may be queried include, but are not limited to, the AWS Price List Service API, GCP Cloud Billing Catalog API, and Azure Retail Rates Prices API. The response to the query, which response may be provided by a cloud storage site, may include the price list API, as well as the minimum storage duration for the tier/class that is being attached to the system. The querying entity may then locally store the price list API and/or minimum storage duration information, such as information storage duration metadata.

In some embodiments, the price list API and/or the minimum storage duration information may change only when all the objects are migrated to some other storage class. The migration of these objects may be performed automatically, or manually. This approach to changing the price list API and/or the changing minimum storage duration metadata may be particularly beneficial in auto-tiering or intelligent tiering kind of environments where the minimum storage duration may change as the data changes tiers/storage classes.

C.3 Copy Forwarding Objects

According to some example embodiments of a cloud GC process, when the cloud GC process starts, the method may then scan the metadata of the objects, with respect to which the GC process is being run, and select any partially filled/fragmented objects, as well as objects marked for deletion, such as unused objects and dead objects. If local metadata for the objects is available in the dedupe system, then the local object metadata, rather than the object metadata stored at the cloud, may be scanned.

Example embodiments of the cloud GC process may further provide a cost filter phase. In the cost filter phase, the cloud GC process may iterate all selected objects for copy-forwarding, and for each object, the cloud GC process may fetch the object creation time from the object metadata. The cloud GC process may then check to see if the object is still within the minimal storage duration or not. One example of such a check may take the form:

If Current Time<(Creation Time+Min Storage Duration)
    Then Object is STILL UNDER Min Storage Duration
Else
    Object is now OUT OF Min Storage Duration purview Based on this query, or check, the cloud GC process may then deselect, for a copy forward process, all such objects which are found to be still within the 'Min Storage Duration.' That is, such objects may be deselected in the sense that those objects will not be copied forward.

After deselection has been performed, the cloud GC process may then perform the copy-forward process only for the objects that appear in the final list of objects, that is, the objects that have been determined to be out of their minimum storage duration. The GC process may also mark these objects for deletion once the copy-forward process has been performed. Note that deleting these objects that are out of their minimum storage duration may not be problematic with regard to data retention requirements, as those objects have already satisfied their respective min storage duration(s).

C.4 Deletion of Dead Objects

Example embodiments of a GC process may provide for deletion of dead objects. Dead objects may include objects that do not contain any live segments. As such, dead objects may be deleted without the need for any other processing, except for identification of the objects as being dead ones.

In example embodiments of the invention, even if a dead object is within minimum storage period, an example GC method may proceed ahead and delete that object. Note that deletion of a dead object in this way may not incur any extra/additional cost, only the cost associated with storing that object for the minimum min storage duration. Thus, example embodiments may provide that a cloud GC may delete all dead objects, irrespective of whether those dead objects are within, or outside, the minimum storage duration that has been assigned to them.

The decision, by some example embodiments, to de-select the dead objects still within minimum storage duration, that is, the decision not to copy forward the dead object, may not have any negative effect on any process. Particularly, those dead objects will still be billed to the customer for storage for the applicable minimum storage duration, regardless of whether those dead objects are kept, or copied forward and deleted.

However, keeping dead objects until their minimum storage duration has run may be advantageous in preventing incurring additional costs since, according to some embodiments, once the minimum storage duration has run for an object, and that object is not copied forward, no further charges should be incurred for storage of that object. Note that retaining the dead objects in the system until their minimum storage duration has run might help in cases where new files created might dedupe to this dead objects thus avoiding the need for creating new objects in dedupe systems.

D. Example Methods

Figure 2:
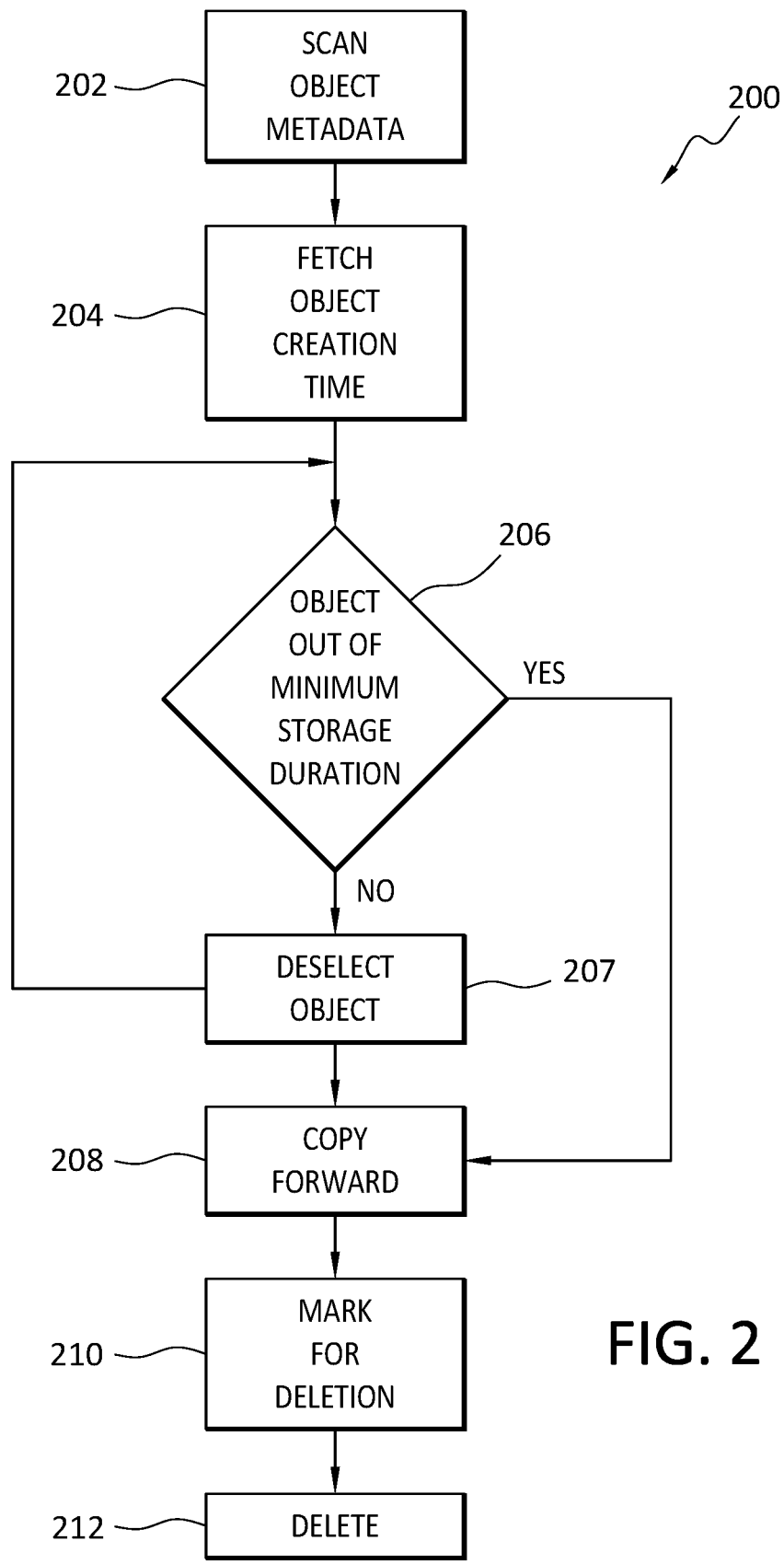
FIG. 2 discloses aspects of an example method for garbage collection according to some example embodiments of the invention.

It is noted with respect to the example method of FIG. 2 that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Directing attention now to FIG. 2, an example method 200 is disclosed. The method 200 may be part of a cloud GC method or process, or may take the form of a stand-alone process.

The method 200 may begin at 202 where object metadata is scanned. The object metadata may concern objects that have been stored at a cloud storage site, for example. The scan 202 of the object metadata may reveal a respective object creation time for one or more objects stored at the cloud storage site. Accordingly, the object creation time(s) may then be fetched 204 from the object metadata.

After the object creation time is known for a stored object, a check 206 may then be performed to determine if that object is out of its corresponding minimum storage duration, that is, whether that object has been stored for at least the minimum storage duration assigned to that object. If the check 206 indicates that the object is not out of its minimum storage duration time, the method 200 may advance to 207 where that object is de-selected, or removed, from a list of objects that have been slated for a copy forward process. After de-selection 207, the method 200 may re-iterate, as shown. That is, one or more subsequent checks 206 may be performed over time until a determination is made that the object is out of its minimum storage duration.

When the check 206 reveals that the object is out of its minimum storage duration, the method 200 may advance to 208 where the object is copied forward. After the new copy has been created at 208, the copy which was determined 206 to have been outside of its minimum storage duration may then be marked for deletion 210. Objects marked for deletion 210 may then be deleted from storage, enabling reclamation of the storage space for use in storing other objects. Reclamation may, or may not, be part of the method 200.

E. Further Discussion

As will be apparent from this disclosure, example embodiments may include various useful aspects. For example, disclosed embodiments may ensures that a copy forward process of a cloud GC process does not result in creation of new objects with segments from older objects which are still within the minimum storage duration and, in turn, such embodiments may thus prevent additional storage costs from incurring un-necessarily.

As another example, some embodiments may also handle any dead objects which need no copy-forward but are within the minimum storage duration. This handling may involve simply deleting those dead objects after expiration of their minimum storage duration.

Example embodiments may also operate, in scenarios where storage class with minimum storage duration is used, to reduce the overall GC processing time. That is, embodiments may operate to reduce, possibly substantially, both the number of copy-forwards performed, and the creation of new objects for copy forward operations.

As a final example, embodiments within the scope of the invention may be particularly beneficial for cloud GC processes operating on cloud storage classes that use minimum storage durations. This is particularly true in view of the current popularity of storage classes due to their ability to help reduce customer data storage costs.

F. Further Example Embodiments

Following are some further example embodiments of the invention. These are presented only by way of example and are not intended to limit the scope of the invention in any way.

Embodiment 1. A method, comprising: scanning, at a cloud storage site, metadata associated with an object stored at the cloud storage site; fetching, from the metadata, an object creation time for the object; and determining whether the object is out of a minimum storage duration, and: when the object is out of the minimum storage duration, copy-forwarding the object, and then marking the object for deletion; and when the object is not out of the minimum storage duration, deselecting the object from a list of objects to be copy-forwarded.

Embodiment 2. The method as recited in embodiment 1, wherein the minimum storage duration is part of a policy set by the cloud storage site, and the minimum storage duration corresponds to a specified storage class.

Embodiment 3. The method as recited in any of embodiments 1-2, wherein the metadata resides either at a dedup server, or at the cloud storage site.

Embodiment 4. The method as recited in any of embodiments 1-3, wherein the minimum storage duration associated with a storage class is obtained by way of a price list API associated with the cloud storage site.

Embodiment 5. The method as recited in any of embodiments 1-4, wherein the method is performed as part of a garbage collection process at the cloud storage site.

Embodiment 6. The method as recited in any of embodiments 1-5, wherein the object is only copy-forwarded when: (i) the object is out of the minimum storage duration; and (ii) the object is not a dead object.

Embodiment 7. The method as recited in any of embodiments 1-6, wherein when the object is not out of the minimum storage duration, and the object is a dead object that does not include any live segments, the dead object is deleted —additionally, or alternatively, the dead object is not deleted until minimum storage duration completes, so that new incoming data can refer, for deduplication, to the segments within these objects.

Embodiment 8. The method as recited in any of embodiments 1-7, wherein after the object is deselected, the object is retained until the minimum storage duration ends.

Embodiment 9. The method as recited in any of embodiments 1-8, wherein deselecting the object reduces a storage cost for the object relative to a storage cost that would be incurred if the object were not deselected.

Embodiment 10. The method as recited in any of embodiments 1-9, wherein determining whether the object is out of a minimum storage duration comprises running the algorithm:
If Current Time<(Creation Time+Min Storage Duration)
  Then Object is STILL UNDER Min Storage Duration
  Else
  Object is now OUT OF Min Storage Duration purview.

Embodiment 11. A method for performing any of the operations, methods, or processes, or any portion of any of these, disclosed herein.

Embodiment 12. A computer readable storage medium having stored therein instructions that are executable by one or more hardware processors to perform operations comprising the operations of any one or more of embodiments 1-11.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 3:
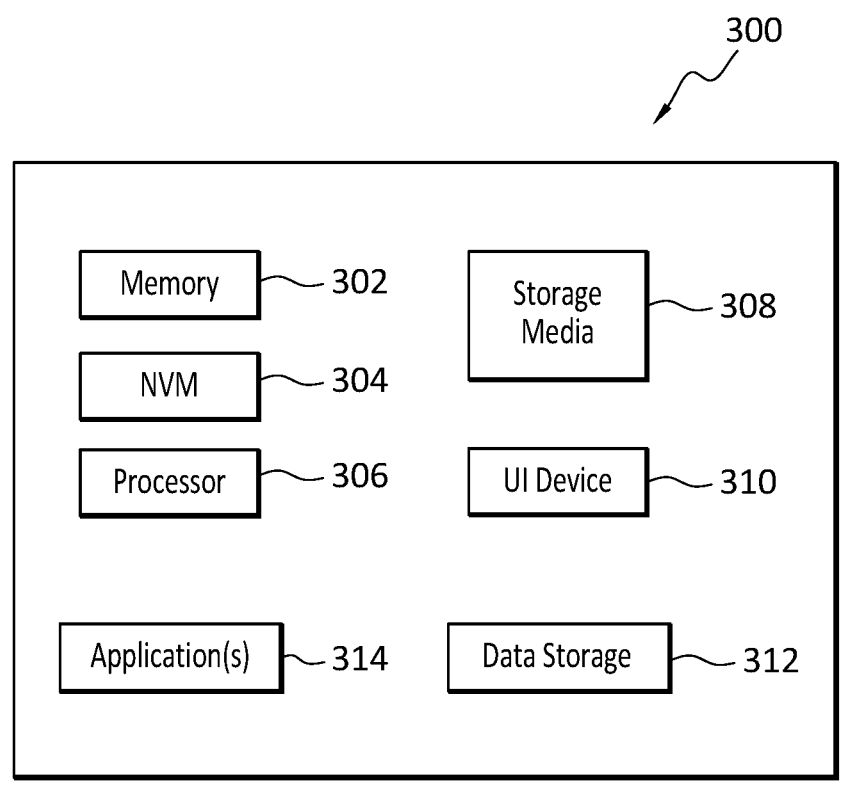
FIG. 3 discloses aspects of an example computing entity operable to perform any of the claimed methods, processes, and operations.

With reference briefly now to FIG. 3, any one or more of the entities disclosed, or implied, by FIGS. 1-2 and/or elsewhere herein, may take the form of, or include, or be implemented on, or hosted by, a physical computing device, one example of which is denoted at 300. As well, where any of the aforementioned elements comprise or consist of a virtual machine (VM), that VM may constitute a virtualization of any combination of the physical components disclosed in FIG. 3.

In the example of FIG. 3, the physical computing device 300 includes a memory 302 which may include one, some, or all, of random access memory (RAM), non-volatile memory (NVM) 304 such as NVRAM for example, read-only memory (ROM), and persistent memory, one or more hardware processors 306, non-transitory storage media 308, UI device 310, and data storage 312. One or more of the memory components 302 of the physical computing device 300 may take the form of solid state device (SSD) storage. As well, one or more applications 314 may be provided that comprise instructions executable by one or more hardware processors 306 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    scanning, at a cloud storage site, metadata associated with an object stored at the cloud storage site;
    fetching, from the metadata, an object creation time for the object; and
    determining whether the object is out of a minimum storage duration, and:
        when the object is out of the minimum storage duration, copy-forwarding the object, and then marking the object for deletion; and
        when the object is not out of the minimum storage duration, deselecting the object from a list of objects to be copy-forwarded, wherein
    the object that is not out of the minimum storage duration is not copy-forwarded and not deleted.

2. The method as recited in claim 1, wherein the minimum storage duration is part of a policy set by the cloud storage site, and the minimum storage duration corresponds to a specified storage class.

3. The method as recited in claim 1, wherein the metadata resides either at a dedup server, or at the cloud storage site.

4. The method as recited in claim 1, wherein the minimum storage duration associated with a storage class is obtained by way of a price list API associated with the cloud storage site.

5. The method as recited in claim 1, wherein the method is performed as part of a garbage collection process at the cloud storage site.

6. The method as recited in claim 1, wherein the object is only copy-forwarded when: (i) the object is out of the minimum storage duration; and (ii) the object is not a dead object.

7. The method as recited in claim 1, wherein when the object is not out of the minimum storage duration, and the object is a dead object that does not include any live segments, the dead object is deleted.

8. The method as recited in claim 1, wherein after the object is deselected, the object is retained until the minimum storage duration ends.

9. The method as recited in claim 1, wherein deselecting the object reduces a storage cost for the object relative to a storage cost that would be incurred if the object were not deselected.

10. The method as recited in claim 1, wherein determining whether the object is out of a minimum storage duration comprises running the algorithm:
    If Current Time<(Creation Time+Min Storage Duration) Then
    Object is STILL UNDER Min Storage Duration
    Else
    Object is now OUT OF Min Storage Duration purview.

11. A non-transitory computer readable storage medium having stored therein instructions that are executable by one or more hardware processors to perform operations comprising:
    fetching, from metadata, an object creation time for the object; and
    determining whether the object is out of a minimum storage duration, and:
        when the object is out of the minimum storage duration, copy-forwarding the object, and then marking the object for deletion; and
        when the object is not out of the minimum storage duration, deselecting the object from a list of objects to be copy-forwarded, wherein
    the object that is not out of the minimum storage duration is not copy-forwarded and not deleted.

12. The non-transitory computer readable storage medium as recited in claim 11, wherein the minimum storage duration is part of a policy set by a cloud storage site, and the minimum storage duration corresponds to a specified storage class.

13. The non-transitory computer readable storage medium as recited in claim 11, wherein the metadata resides either at a dedup server, or at a cloud storage site.

14. The non-transitory computer readable storage medium as recited in claim 11, wherein the minimum storage duration for a storage class is obtained by way of a price list API associated with a cloud storage site.

15. The non-transitory computer readable storage medium as recited in claim 11, wherein the operations are performed as part of a garbage collection process at a cloud storage site.

16. The non-transitory computer readable storage medium as recited in claim 11, wherein the object is only copy-forwarded when: (i) the object is out of the minimum storage duration; and (ii) the object is not a dead object.

17. The non-transitory computer readable storage medium as recited in claim 11, wherein when the object is not out of the minimum storage duration, and the object is a dead object that does not include any live segments, the dead object is deleted.

18. The non-transitory computer readable storage medium as recited in claim 11, wherein after the object is deselected, the object is retained until the minimum storage duration ends.

19. The non-transitory computer readable storage medium as recited in claim 11, wherein deselecting the object reduces a storage cost for the object relative to a storage cost that would be incurred if the object were not deselected.

20. The non-transitory computer readable storage medium as recited in claim 11, wherein determining whether the object is out of a minimum storage duration comprises running the algorithm:

If Current Time<(Creation Time+Min Storage Duration)
Then
Object is STILL UNDER Min Storage Duration
Else
Object is now OUT OF Min Storage Duration purview.

* * * * *